(12) United States Patent
Witzel et al.

(10) Patent No.: US 8,249,054 B2
(45) Date of Patent: Aug. 21, 2012

(54) PROVISION OF PACKET-BASED SERVICES VIA CIRCUIT-SWITCHED ACCESS

(75) Inventors: Andreas Witzel, Herzogenrath (DE); Ralf Keller, Würselen (DE); George Foti, Dollard des Ormeaux (CA); Stephen Terrill, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 387 days.

(21) Appl. No.: 12/279,904

(22) PCT Filed: Feb. 23, 2006

(86) PCT No.: PCT/EP2006/001680
§ 371 (c)(1),
(2), (4) Date: Aug. 19, 2008

(87) PCT Pub. No.: WO2007/095965
PCT Pub. Date: Aug. 30, 2007

(65) Prior Publication Data
US 2009/0016330 A1    Jan. 15, 2009

(51) Int. Cl.
*H04L 12/66* (2006.01)
(52) U.S. Cl. .................. 370/352; 370/354
(58) Field of Classification Search .............. None
See application file for complete search history.

(56) References Cited

U.S. PATENT DOCUMENTS

| 2002/0110104 A1* | 8/2002 | Surdila et al. ........... 370/338 |
| 2004/0190498 A1* | 9/2004 | Kallio et al. ............ 370/352 |
| 2005/0141484 A1  | 6/2005 | Rasanen |

FOREIGN PATENT DOCUMENTS

| WO | WO 00/13426 A2 | 3/2000 |
| WO | WO 2004/073279 A1 | 8/2004 |
| WO | WO 2006/010614 A2 | 2/2006 |

OTHER PUBLICATIONS

Digital cellular telecommunications system (Phase 2+); Universal Mobile Telecommunications System (UMTS); Interworking between the IP Multimedia (IM) Core Network (CN) subsystem and Circuite Switched (CS) networks (3GPP TS 29.163 version 6.6.0 Release 6); ETSI TS 129 163 ETSI Standards, European Telecommunications Standards Institute, Sophia-Antipo, FR, vol. 3-CN3, No. V660, Mar. 2005.

Juergen Carstens: "MSC Server/MSC with Integrated MGCF (MSCF)" IP.COM Journal, IP.COM Inc., West Henrietta, NY, US, Jun. 25, 2004.

* cited by examiner

*Primary Examiner* — Otis L Thompson, Jr.

(57) ABSTRACT

The present invention proposes a solution for providing IMS services and in particular mid-call services to users having circuit-switched controlled terminals and being not adapted to provide IMS services to the users. In particular, it is proposed to introduce a new node type called Mobile Access Gateway Control Function (MAGCF). This new node combines the logical functionality of a cellular switching center and the logical functionality of packet-based logic. The invention discusses a concept of the MAGCF handling mid-calls, which comprises identification of the received mid-call request, generating in accordance to the identified mid-call a corresponding message, tracking the status of the performed mid-calls.

15 Claims, 6 Drawing Sheets

US 8,249,054 B2

PROVISION OF PACKET-BASED SERVICES VIA CIRCUIT-SWITCHED ACCESS

TECHNICAL FIELD OF THE INVENTION

Figure 1:
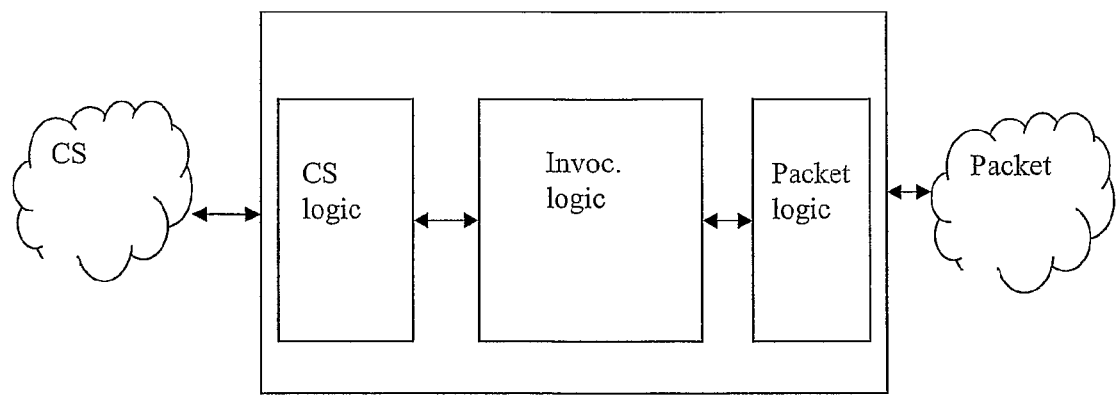

The present invention relates to providing packet-based services applicable during an ongoing call to a user having circuit-switched controlled user's equipment. In particular the invention provides a solution being applicable for both a mobile user with a mobile terminal and for a user with a fixed terminal.

BACKGROUND

Third Generation (3G) Networks such as UMTS (Universal Telecommunication Network) and CDMA 2000 provide high-speed wireless Internet access to mobile users over a wide coverage area. For the 3G networks the IP Multimedia Subsystem IMS has been defined to provide cellular access to the services of the Internet in order to support telephony and multimedia services. The IMS uses packet-based technology, in particular IP-network and other IETF protocols for provision of services. The strength of IMS is the provision of enhanced services, for example multimedia services combining voice and data. Further, the usage of IP-network as a single underlying standard allows an easy and fast service deployment. In contrary, 2nd Generation networks, like GSM, provide voice based on a circuit-switched technology.

Besides voice and data calls, in UMTS 3GPP standard a number of so-called mid-call services are defined, which are characterised by the fact that during an ongoing call the user initiates a service invocation. Some examples of mid-call services are:

Communication Diversion/Call Deflection (CDIV/CD)
Explicit Communication Transfer (ECT)
Communication Hold/Resume/Retrieve (HOLD)
Conference and 3 party call (MPTY, CONF)
Call Waiting (CW)
Call Completion to busy Subscribers (CCBS)

A detailed description of the different mid-call might be found in 3GPP TS 22.004 for TS11 and other teleservices.

A Session Initiation Protocol SIP has been chosen in IMS for signalling between the user's equipment UE and the IMS as well as between the components within the IMS. The IMS uses SIP also to complete voice and multimedia calls in the Internet. In order to be able to use the IMS service, the communicating user's equipment has to support IMS, which means SIP has to be implemented in the user's equipment.

The IMS supports inter-working with legacy networks. This support is provided by a Media Gateway Control Function (MGCF). The MGCF performs protocol conversion between cellular call control protocols and IMS protocols. For example, the MGCF receives a SIP message from the IMS and converts it into appropriate ISUP messages. Thus, the primary function of MGCF is to convert signalling information from one format to another in uplink and downlink direction.

The IMS has been deployed for 3G networks for provision of services using packet-based technology with SIP as applied signalling protocol. IMS provides, amongst others, Call State Control Functions (CSCF), which allow routing of SIP messages from and to users connected via access networks to application servers and other control functions. There are three types of CSCF, namely Proxy-CSCF (P-CSCF), Interrogating-CSCF (I-CSCF) and Serving-CSCF (S-CSCF). IMS services are implemented in application servers. One main task of the P-CSCF is to store the S-CSCF address for the user, the I-CSCF supports the lookup of the S-CSCF for a user' call and is a contacting point providing a service session control.

However, currently the major number of user's equipment do not support IMS technology with SIP as signalling protocol for voice and mid-call services, since said user's equipment is adapted for a circuit-switched controlled domain. Thus, for the access to the IMS an adaptation of the user's equipment is necessary.

SUMMARY AND DESCRIPTION OF THE INVENTION

Therefore, it is an object of the present invention to provide a solution for providing packet-based services to user's equipment operating in circuit-switched controlled domain. In particular it is object of the present invention to provide mid-call services to said user's equipment while accessing packet-based domain.

The invention is disclosed in the independent claims. Advantageous embodiments are described in the dependent claims being disclosed in the corresponding parts of the description.

According to the present invention it is proposed to provide an Access Gateway Node adapted to invoke a service in a packet-based multimedia system, like for example IMS for a user with a circuit-switched controlled user's terminal, wherein this might be either a mobile terminal or a fixed terminal and wherein said user is located in a circuit-switched controlled domain, like Public Land Mobile Network PLMN or Public Switch Telephone Network PSTN. The invention provides a solution for mid-calls, which are initiated while said user has an ongoing call. According to the present invention it is proposed to provide the Access Gateway Node with the following logics. A circuit-switched logic, CS logic, being adapted to receive or to send service invocation information related to the ongoing call from or to the circuit-switched controlled domain. For example it might be a co-located MSC-S in case of a mobile user or in case the Access Gateway node is a stand-alone node; in general any logic providing a connectivity to a circuit-switched control switch. Further it is proposed to have a packet-based multimedia logic, Packet logic, adapted to receive or to send packet-based service invocation information from or to the packet-based multimedia system. This is any logic which provides packet-based bearer; this might be for example a functionality which corresponds to the functionality of a P-CSCF node. Further it is proposed to have a service invocation logic adapted to identify a service according to the received service invocation information from the circuit-switched logic or according to the received packet-based service invocation information from the packet-based multimedia logic. Thus, at first the Access gateway Node is adapted to identify which kind of mid-call is received, herein the service invocation request might be received either from the circuit-switched controlled domain or from the packet-based multimedia domain. Further the service invocation logic is adapted to handle a corresponding service execution in respect to the identified service, which includes also maintaining of the status of the service execution.

Moreover the present invention proposes a method for invoking a service in a packet-based multimedia system for a user with a circuit-switched controlled user's terminal located in a circuit-switched controlled domain and having an ongoing call. In the following described steps are to be performed in the Access Gateway Node. The method proposes to receive service invocation information related to the ongoing call from the circuit-switched controlled domain. A service invocation message might be received also from the packet-based multimedia system, therefore the method proposes to receive a packet-based service invocation information. In the next step of the method it is proposed to identify a service according to the received service invocation information or according to the received packet-based service invocation information. When the service is identified it is proposed to handle a service execution in respect to the identified service, wherein the service execution comprises conversion of the formats of the used transmission means (like protocols or tones) between the packet-based multimedia system and the circuit-switched controlled domain and the maintaining of a status of the service execution. Further it is proposed to send a service invocation information related to the identified service to the circuit-switched controlled domain and to send of a packet-based service invocation information related to the identified service to the packet-based multimedia.

The advantage of the present invention is that it provides a smooth migration from a circuit-switched domain to a packet-based domain. In particular for a user using a circuit-switched adapted equipment a solution is given to use mid-calls in a IMS domain.

Further advantageous embodiments are described in the dependent claims.

Figure 2:
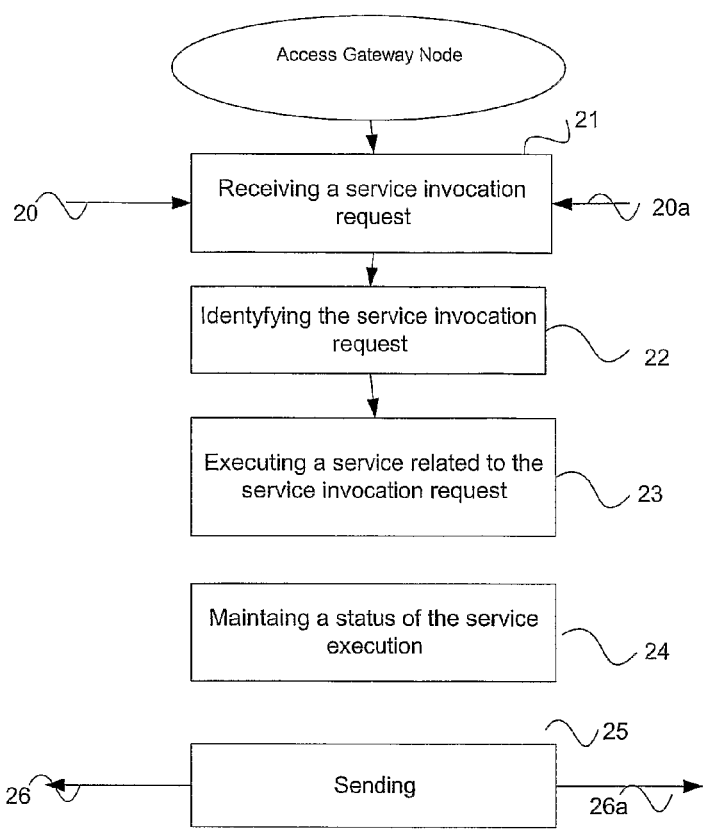
Figure 3:
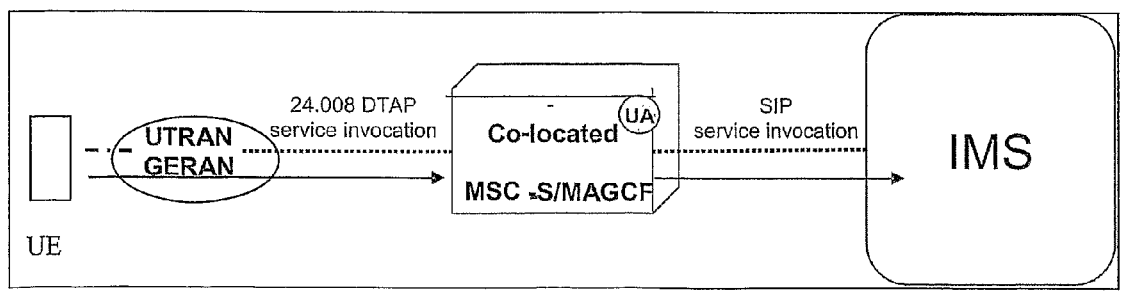
Figure 4:
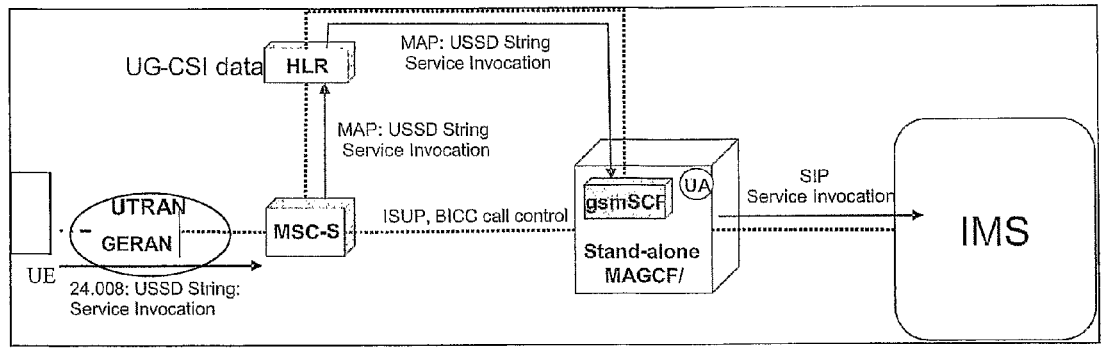
Figure 5:
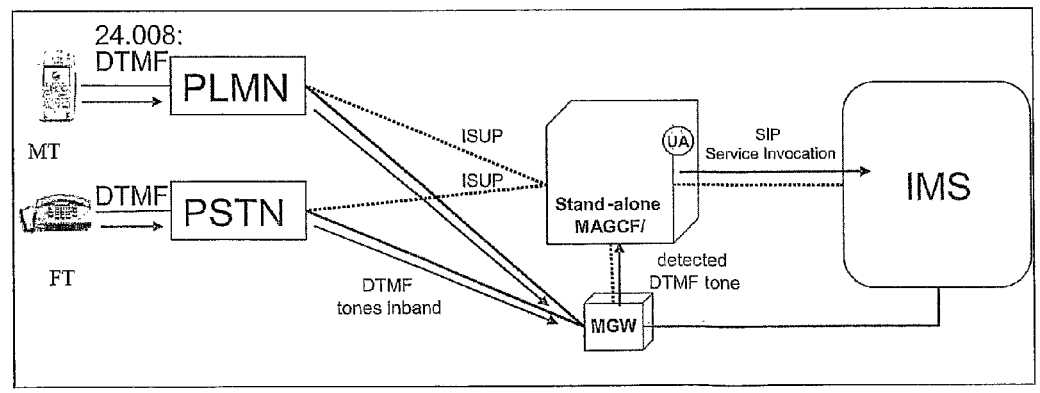
Figure 6:
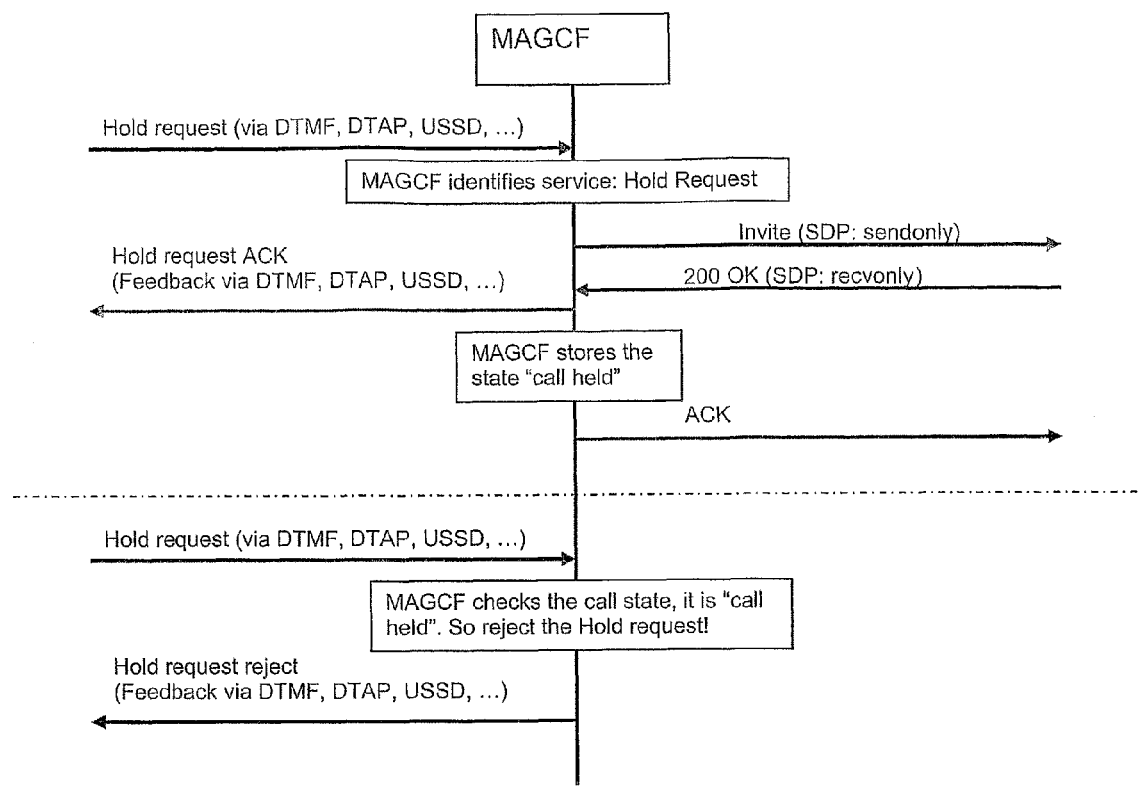
Figure 7:
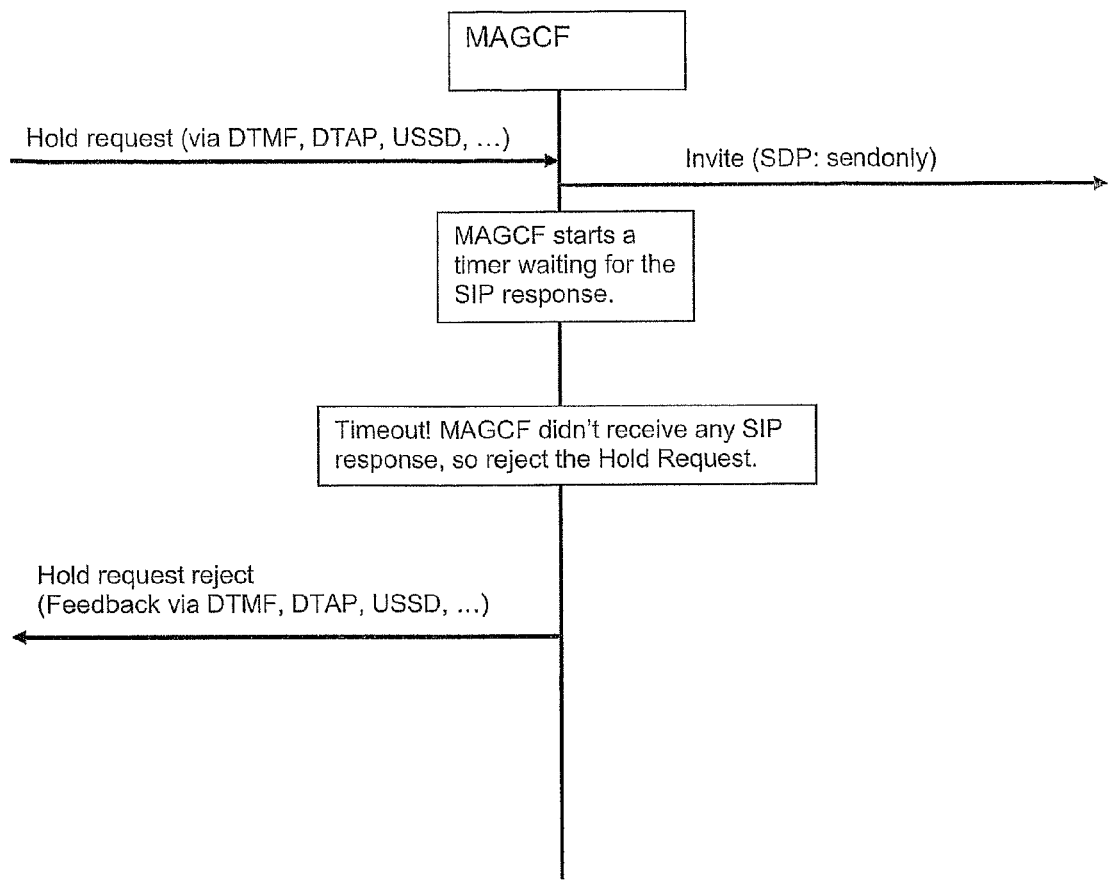
Figure 8:
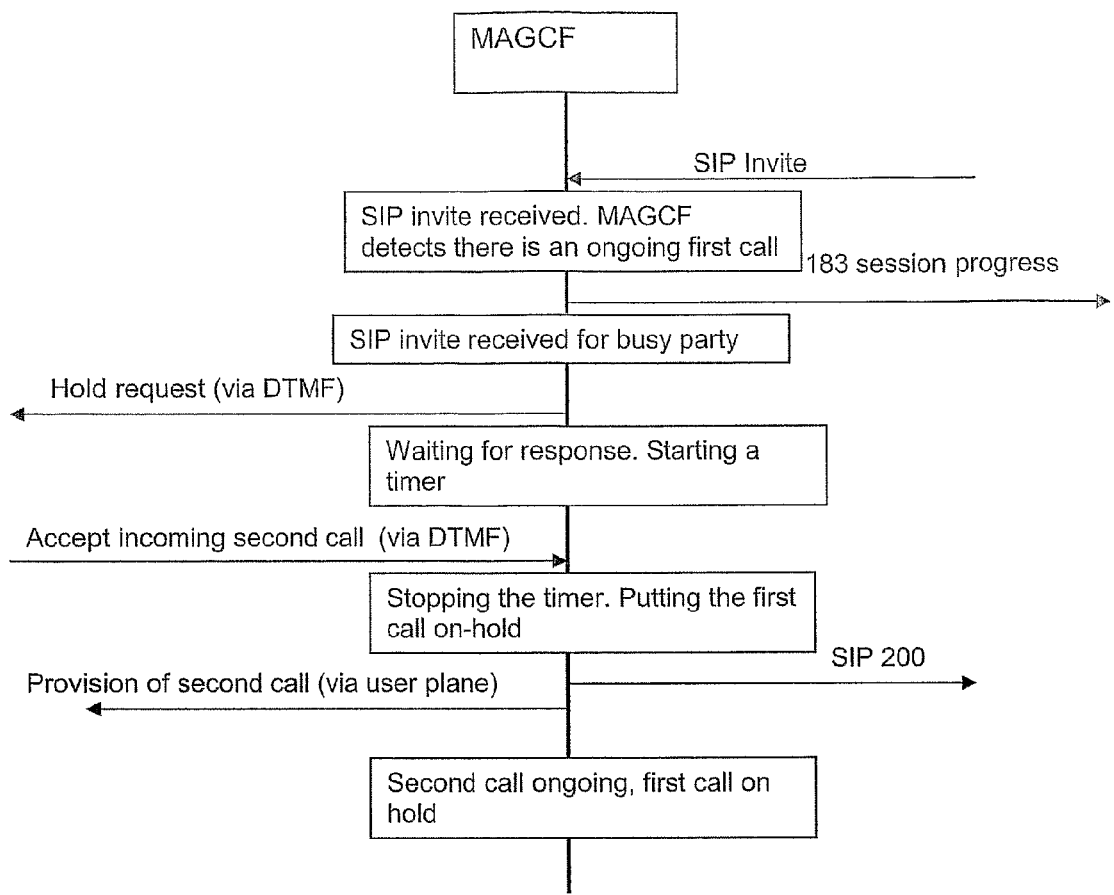

In the following preferred examples of the present invention shall be described in detail, in order to provide the skilled person with thorough and complete understanding of the invention, but these detailed embodiments only serve as examples of the invention and are not intended to be limiting. The following description shall make reference to the enclosed drawings, in which FIG. 1 shows a schematic representation of an architecture of Access Gateway Node according to the present invention, and FIG. 2 shows a flowchart of an embodiment of the present invention for a method being to be performed on the Access Gateway Node, FIG. 3 shows an embodiment of the present invention when the Access Gateway Node is co-located in a serving node and a DTAP protocol is used in the circuit-switched controlled domain, FIG. 4 shows an embodiment of the present invention when the Access Gateway Node is a stand-alone node and USSD protocol is used in the circuit-switched controlled domain, FIG. 5 shows an embodiment of the present invention when the Access Gateway Node is a stand-alone node and DTMF tones are used in the circuit-switched controlled domain, FIG. 6 shows a schematic message exchange embodiment in the Access Gateway Node for accepting HOLD mid-call, FIG. 7 shows a schematic message exchange embodiment in the Access Gateway Node for rejecting HOLD mid-call, FIG. 8 shows a schematic message exchange embodiment in the Access Gateway Node for accepting HOLD mid-call while using DTMF tones.

It should be noted that the term "node", "equipment" "terminal" in the context of the present invention refers to any suitable combination of hardware and software for providing a predetermined functionality in the communication network. In this way, said terms generally refers to a logical entity that can be spread out over several physical entities, but can also refer to a physical entity located in one physical location, if no explicit definition is given.

Preferably, the communication network is a mobile communication network, e.g. is a wireless communication network operating according to GSM, or GPRS (General Packet Switched Radio) or any 3G system like for example UMTS (Universal Mobile Telephone System), EDGE, and CDMA2000. Preferably, the packet-based multimedia system, is the IMS.

According to the present invention it is proposed, in order to allow the packet-based multimedia system to take the full call and service control, to combine the logical functionality of a cellular switching centre and the logical functionality of the packet-based multimedia system in an Access Gateway Node, which is called in the following MAGCF. In particular it is proposed that this new MAGCF node comprises a serving circuit-switched functionality like for example MSC or a GMSC-S in case of mobile user or in general a logic providing and handling a circuit-switched controlled bearer. Further it is proposed that the MAGCF has packet-based multimedia functionality which is in particular an user agent and/or a proxy call control function, like for example the P-CSCF.

In general it might be said that the MAGCF handles in the packet-based multimedia domain on behalf of the user with a circuited-switched terminal. Further it is proposed that the MAGCF has the control over the performed operations between cellular call control protocols and IMS protocols, this comprises among others also protocol conversion.

FIG. 1 presents schematically a structure of a MAGCF being an anchor point for the user's circuited-switched control terminal between a circuited-switched CS network and a packet-based multimedia network Packet.

There is a circuit-switched logic, CS logic, adapted to receive and/or to send a service invocation information, in form of a DTAP or USSD protocol or DTMF tone from or/and to the circuit-switched controlled domain like for example GSM or a PSTN. Preferably the information is received (send) from (to) a circuit-switched node, like MSC or MSC-S or a fixed switch serving the user. The MSC might be either a stand-alone node or it might be integrated in the MAGCF. Generally, the circuit-switched function is preferably a function fulfilling the functionality required to exchange information with the cellular-switched controlled network, in which a user is located. Further the MAGCF comprises a Packet logic, which is adapted to receive and to send a packet-based service invocation message from and to the packet-based system, like for example IMS. The protocol for the packet-based invocation message is preferably the SIP protocol.

Further it is proposed to provide a service invocation logic, Invoc. logic, which is adapted to analyze the received service invocation request (received either from the packet-based system or from the circuit-switched controlled domain). Thus, at first the MAGCF is adapted to identify which kind of mid-call service invocation request is received. Further the service invocation logic is adapted to initiate a corresponding service execution in respect to the identified service, this means that a corresponding message is sent either to the packet-based system or to the circuit-switched controlled domain. The service invocation logic performs also a corresponding conversion of the message format, which usually differentiates between the packet-based system and the circuit-switched controlled domain. Moreover the service invocation logic maintains the status of the service execution, wherein the status information might include also a timer tracking a receiving of an answer for a sent message.

In the following a method according to the present invention is described in respect to FIG. 2. FIG. 2 presents steps which are to be performed in the Access Gateway Node, MAGCF. In the first step 21 the MAGCF receives a service invocation request being a general term for service invocation information or packet-based service invocation message, wherein said request is received either from the packet-based system 20*a* or from the circuit-switched controlled domain

20. In step 22 the service invocation request is identified which means the type of the mid-call is determined. When the service is identified it is proposed to initiate a service execution in respect to the identified service, wherein the service execution comprises among others converting the messages format and generating new messages, 23. In step 24 the status of the service execution is stored and in step 25 it is proposed to send service invocation information related to the identified service to the circuit-switched controlled domain, 26 or to send a packet-based service invocation information related to the identified service to the packet-based multimedia domain, 26*a*.

According to the present invention there might be different embodiments for provision of the MAGCF and for applying service invocation information. The detailed description of the embodiments will be given in the further part of the description.

In one embodiment it is proposed to co-locate the MAGCF with the serving MSC-S. In this case the user's terminal is to be adapted to send an appropriate circuit-switched signaling, like for example DTAP signaling, directly to the MSC-S and the MSC-S forwards said signaling message to the conversion logic for converting it into SIP service invocation message.

In other embodiment it is proposed that the MAGCF is stand-alone node, which implies that the MAGCF is not co-located with the serving MSC-S or the subscriber is using a fixed phone. In this case appropriate service invocation information is to be used, like for example DTMF inband signaling or in case the subscriber is using a mobile phone, like the 24.008 USSD signaling.

Further it is proposed for mobile phone users to use a GPRS/WCDMA packet bearer to convey the service invocation trigger in case the terminal is able to establish in parallel this kind of bearer.

Independent on the used protocol bearer or method for transferring the service invocation information related to the ongoing call from or to the circuit-switched controlled domain, the MAGCF applies according to the present invention a procedure in a service logic node in order to invoke a service in the packet-based multimedia domain, like in the IMS. This procedure will be described further in more details.

In the following different embodiments for the realization of the invention are described.

In the following, in respect to FIG. 3, an embodiment for performing a service invocation procedure for mid-calls when the MAGCF is co-located with the serving MSC-S is given. FIG. 3 depicts a user's equipment UE communicating over an air-interface, UTRAN/GERAN, with a collocated MSC-S/MAGCF node. Said communication is performed by means of a DTAP signalling, wherein the communication between collocated MSC-S/MAGCF and the IMS domain is performed by mean of a SIP-signalling. In MAGCF a user agent UA is depicted, which has the responsibility to handle on behalf of an user located in the circuit-switched domain, for example UA is responsible for registering a user in the IMS domain.

Thus, according to FIG. 3, the terminal transfers the service invocation request via the existing DTAP messages to the MSC-S. The Direct Transfer Application Part DTAP as known is used for messages exchange between MSC and a mobile station. In particular said protocol is used to transfer messages related to connection setup and mobility management. The transmission with DTAP protocol is transparent for a base station system. Transaction IDs are used to associate the DTAP messages with a particular mobile terminal and the current call.

The format of a DTAP message and the procedure of performing service invocation by means of DTAP is known and described in (3GPP TS 24.080 and 3GPP TS 24.008). According to the present invention it is proposed that the service logic upon receiving the DTAP message performs procedural steps, which lead to conveying a service invocation. At first it is identified which of the mid-call services is to be performed and to which user's ongoing call it is related. Further the status of the call is stored. In case the MAGCF decides to initiate a corresponding service invocation call in the IMS, it is preferably proposed that the MAGCF sends a feedback information to the user that the call is for example in an establishing phase and the MAGCF starts the initiation phase by converting the DTAP service invocation request to the appropriate SIP messages in the IMS. Herein the packet-based multimedia logic is involved, which sends a corresponding SIP signaling.

In the following an embodiment for providing service invocation information is given in respect to FIG. 4. FIG. 4 depicts a user's equipment UE communicating over an air-interface, UTRAN/GERAN, with a MSC-S node. Said MSC-S node communicates with a HLR and with a stand-alone MAGCF node, which ensure a communication to the IMS.

According to this embodiment the MAGCF is stand-alone node, which might occur-in different scenarios. According to FIG. 4 the subscriber is roaming in the home network and a static MAGCF has been selected, which means that there is a number of serving MSC-S and one MAGCF communicating with the corresponding MSCs-S. Further scenario might be that the MAGCF is a roaming anchor point for the subscriber roaming in a visited network.

According to FIG. 4 the subscriber invokes a mid-call service, and the invocation request is packed into a USSD container string, 24:008: USSD String: Service Invocation. The USSD Unstructured Supplementary Service Data is a GSM service for exchange information between a user and a network, an example is the call forwarding, like for example "61*Number*11*10" means call forwarding "61" for the voice call "11" with the number "number" with the delay of 10 seconds. Corresponding user friendly commands are stored in a mobile terminal. The commands which are to be transferred into USSD commands might be introduced and configured in the terminal by the subscriber or the terminal can derive it from some information stored in the SIM card and being provided by the operator specifically for subscribers wishing to invoke any service.

According to FIG. 4 the USSD string is received by the serving MSC-S and tagged in a way that the MSC-S recognizes that it has to forward the USSD string to the HLR. This communication might be performed preferably by means of the Mobility Application Protocol MAP.

The reception of the USSD string in the HLR triggers the USSD CAMEL trigger, which is defined in the HLR as subscriber data for this subscriber.

The CAMEL approach is taken as an example and it has no restriction to the present invention. CAMEL is a network feature which allows the network operator to provide the mobile subscribers with the operator specific services even when mobile subscribers are roaming outside the home network. According to CAMEL architecture, CAMEL Service Control Functionality (gsmSCF) functionality is to be provided in the subscriber's home PLMN, which contains the CAMEL service logic needed to implement operator specific services. In the frame of CAMEL, a so called Trigger Detection Point (TDP) is defined, which specifies a point of time in transaction handling when the gsmSCF shall be contacted. When the TDP is met a dialog to gsmSCF is opened. There is a number of functionalities defined for the gsmSCF, among other things; the gsmSCF can be provided with information about ongoing transaction of a user, like for example destination address and duration of transaction.

Returning to FIG. 4 the HLR uses the CAMEL functionality to inform the MAGCF about user's specific service invocation request represented as a USSD string. Thus, the HLR sets Trigger Detection Point including contacting data for the gsmSCF being co-located with the MAGCF, which according to the present invention is the address of the stand-alone MAGCF node to be used for the subscriber. Further information is to be preferably the CAMEL service key indicating that the subscriber uses IMS services.

So finally the MAGCF receives the mid-call service invocation, in form of USSD string Service Invocation, performs the handling of the mid-call according to the present invention and forwards that to IMS for service execution, SIP Service Invocation.

Another embodiment for providing a service invocation message is by means of a DTMF Dual Tone Multi Frequency tones. These tones are usually generated by pressing keys on a user's terminal and are for example used for controlling of voice mailboxes or answering machines or for realising a supplementary services like the mid-call services. The DTMF tones are sent inband by choosing individual frequency combinations so that it is possible to send it over the same connection link. On one side an encoder on the sending side is needed and on the receiving side a decoder. According to the present invention it is proposed to introduce in the case of stand-alone MAGCF a DTMF tone-based solution. With this DTMF tone-based alternative it is possible to support mobile terminal as well as fixed line phone connected to any PSTN or ISDN network. The solution by using DTMF is described in the following in respect to FIG. 5. According to FIG. 5 two user's terminals are depicted, a mobile terminal MT communicating over a Public Land Mobile Network PLMN and a fixed telephone FT communicating over Public Switched Telephone Network PSTN with a stand-alone MAGCF. The MAGCF according to the present invention provides a connection to a packet-based multimedia domain, like the IMS. Further a Media Gateway Node MGW handling user's payload traffic, as it is already known is depicted According to the present invention it is proposed that a subscriber invokes the service by typing a specific digit combination on the keypad of the terminal. Each pressed key generates a specific DTMF tone which is then send inband towards the MGW. It is to be noted that possible digit strings are well-known and standardized, however also any other market or operator-specific definition could be used. According to FIG. 5 the control signaling is sent to the MAGCF by means of an ISUP protocol and the payload information, user plane, is directed to the MGW. It is proposed that the MAGCF instructs its MGW to monitor the user plane for inband DTMF tones. There might be different embodiments for performing the monitoring procedure, herein two examples are given. It is proposed that either the MGW is instructed to watch out for a specific digit map, or the MGW is instructed to report each and every recognized DTMF tone to the MAGCF.

If the MGW reports every DTMF tone, then the MAGCF needs first to recognize the specific digit map identifying a mid-call command. In both cases (digit map and reporting of every DTMF tone) the MAGCF needs to provide a function to recognize the service that is identified by the DTMF digit string. As soon as the invoked service is identified, the invocation is triggered within the MAGCF which includes mapping into the appropriate SIP signaling and forwarding to IMS.

In the presented embodiments the direction between a user's terminal and a MAGCF is described. It is to be mentioned that the same protocols are to be used in the direction from the MAGCF to a user's terminal. Independent on the used protocol for transferring the service invocation information related to the ongoing call from or to the circuit-switched controlled domain, the MAGCF applies according to the present invention a procedure in a service invocation logic in order to invoke a service in the corresponding domain. In particular the service is to be identified, a relation to an ongoing call is to be established and a status of the corresponding parameters is to be maintained.

In the following some embodiments are given presenting the functionality of the MAGCF in accordance with the present invention.

In respect to FIG. 6a and FIG. 6b embodiments of procedures to be realized in a MAGCF in order to perform a mid-call are depicted. In FIG. 6a and 6b, MAGCF is depicted and messages, in form of arrows, which are to be sent or received to or from the MAGCF are shown.

In FIG. 6a a hold mid-call is depicted which causes that an ongoing call is put in an "on-hold" status. In a first step the MAGCF receives a Hold request. As it is aforementioned the service invocation information might be performed by means of any suitable and preferable protocol, like for example a DTMF, DTAP or USSD protocol. In the next step the MAGCF identifies the service, which in this example is a Hold Request and additionally the ongoing call, to which the message relates, is identified. Upon the identification is made the MAGCF initiates the service invocation procedure in the IMS. According to FIG. 6 the message Invite (SDP: sendonly) is send and 200 OK (SDP: recvonly) as an acknowledgment message is received. By means of the a priori applied protocol, like for example DTMF, DTAP, USSD, an acknowledgment message, Hold request ACK (Feedback via DTMF, DTAP, USSD, . . . ) is sent to the user's terminal. The MAGCF stores the status of the ongoing call, namely "call held" in the next step.

In case the MAGCF receives a new Hold request message, as it is depicted in FIG. 6b, then after performed identification of the service invocation message and after assigning said invocation to an ongoing call, the MAGCF recognizes that said ongoing call is already set to "on-hold". As result the MAGCF rejects the received hold request by sending Hold request reject (Feedback via DTMF, DTAP, USSD, . . . ).

Furthermore it is proposed according to the present invention to maintain additional parameters, like for example timers. This embodiment is presented in FIG. 7. Thus after receiving the Hold request (via DTMF, DTAP, USSD, . . . ) from a user's terminal, the MAGCF sends a corresponding service invocation message to the IMS, Invite (SDP: sendonly), after the received service invocation information has been identified. The MAGCF stores the status of the ongoing call and additionally it is proposed that the MAGCF starts a timer while waiting for the SIP response from IMS. Thus in this case maintaining of the status information comprises storing and updating of the current status and of the timer. In case the MAGCF receives an answer from the IMS it continues as afore described. If however a timeout occurs meaning that no answer has been received from IMS, then the Hold Request is rejected and the message Hold request reject (Feedback via DTMF, DTAP, USSD, . . . ) is sent back to the user's terminal.

In accordance to FIG. 8 an embodiment is presented showing the procedures at the MAGCF when a service invocation message is received from the IMS. Furthermore the embodiment shows the dynamic updates of the stored status in the MAGCF. In order to simplify the description, the communication is performed between a user B being located in the circuit-switched controlled domain and a user A being in the packet-based domain. Both users are not depicted in FIG. 8. Herein it is to be noted that it is not important which party, A or B, is the originating or the terminating side.

As already mentioned the MAGCF needs to keep track on ongoing calls.

In the first step, the MAGCF receives a packet-based service invocation, namely SIP invite for contacting the user B. By that, it starts a procedure at the service invocation logic. At first the status, "SIP invite received", is stored. In the next step, the MAGCF detects that B party has an ongoing call. The MAGCF sends "183 session progress" to A party of second call and updates the internal state to "SIP invite received for busy B party". The MAGCF initiates in the next step the put on-hold procedure for the first call in order to receive the second call. As in the previous embodiments mentioned this might be performed by any suitably protocol. In this embodiment the DTMF is taken as an example. At first the MAGCF instructs the MGW to send notification tone to B user, which is performed on the existing user plane of the ongoing first call. Further the MAGCF instructs the MGW, if not already done, to detect DTMF tones coming from B user and it updates the status to "SIP invite received for busy B party—waiting for response from B party" and starts a timer. According to one embodiment of the present invention it is proposed that in case a timeout occurs before receiving a response from B party to send BYE to user A regarding the second call, preferably with an error cause. This scenario is not depicted in FIG. 8.

In case the MGW detects DTMF tones coming from user B then it sends digits to MAGCF. As already mentioned, either the MAGCF collects the digits or a complete recognized command is sent to the MAGCF. Independent on the approach, the MAGCF receives the information, "accept incoming second call". Consequently the timer is stopped and the first call is put on-hold. Additionally the MGW is instructed to connect call legs, which means to connect the user planes of user A and user B. Furthermore a "SIP 200OK" is sent to user A meaning that the second call is going to be switched through. Finally the status in the MAGCF is updated to "second call ongoing, first call on hold".

The above mentioned embodiments show scenarios when a second call is coming while a first call is ongoing. In the presented scenarios the user accepts the second call and the first call is put on-hold. Alternatively a possibility is described to reject the second call. Moreover different status states of the MAGCF are mentioned. However it is to be mentioned that the present invention is also applicable to other mid-calls besides the Hold mid-call and the examples of status are not to be seen as any restriction to the present invention. The implementation of the status states depends on the mid-call type and is to be done in any suitable and preferably form.

The above-described embodiments are based on integration of cellular-switched controlled user equipment, like it is provided in GSM or GPRS, into IMS services developed in connection with UMTS. However, the present invention is not only restricted to these networks. A further example might be CDMA2000 providing corresponding nodes as the nodes existing in GPRS or UMTS.

The invention claimed is:

1. An Access Gateway Node (MAGCF) adapted to invoke a service in a packet-based multimedia system for a user with a circuit-switched controlled user's terminal located in a circuit-switched controlled domain and having an ongoing call wherein said node comprises:
   a microprocessor unit coupled to a memory unit, wherein the microprocessor is operable to run instruction sets stored in the memory unit for executing:
   a circuit-switched logic (CS logic) adapted to receive and to send a service invocation information related to the ongoing call from or to the circuit switched controlled domain;
   a packet-based multimedia logic (Packet logic) adapted to receive and to send a packet-based service invocation information from or to the packet based multimedia system; and,
   a service invocation logic (Invoc. logic) adapted to identify a packet-based multimedia service according to the received service invocation information from the circuit-switched logic or according to the received packet-based service invocation information from the packet-based multimedia logic and handle a corresponding packet-based multimedia service execution in respect to the identified packet based multimedia service on behalf of the user by using one or more parameters, including status of the ongoing call, the one or more parameters being stored and administered by the MAGCF.

2. Access Gateway Node according to claim 1 wherein the circuit-switched controlled user's terminal is either a mobile terminal or a fixed line phone.

3. Access Gateway Node according to claim 1 wherein the handling of the service execution in the service invocation logic comprises a converting procedure for converting either a service invocation information into a corresponding packet-based service invocation information or converting a packet-based service invocation information into a corresponding service invocation information.

4. Access Gateway Node according to claim 1 wherein the service invocation logic comprises a tracking procedure for maintaining a status of the service execution in order to handle the service execution.

5. Access Gateway Node according to claim 3 wherein the service invocation logic comprises a feedback generating procedure for generating a feedback informing about the status of the service execution in order to handle the service execution.

6. Access Gateway Node according to claim 4, wherein the maintaining of the status of the service execution comprises a maintaining of a timer for tracking a receiving of an answer for the sent service invocation information and for the sent packet-based service invocation information.

7. Access Gateway Node according to claim 1, wherein said Access Gateway Node is located in a serving mobile switch (MSC) and the service invocation information is a signaling message sent directly from the circuit-switched controlled user's terminal to the Access Gateway Node.

8. Access Gateway Node according to claim 1, wherein said Access Gateway Node is a stand-alone node.

9. Access Gateway Node according to claim 8 wherein the service invocation information is a signaling message sent from the circuit-switched controlled user's terminal over a serving switch to the Access Gateway Node.

10. Access Gateway Node according to claim 8 wherein the service invocation information is an inband tone sent in a user plane.

11. A method for invoking a service in a packet-based multimedia system for a user with a circuit-switched controlled user's terminal located in a circuit-switched controlled domain and having an ongoing call, the method comprising the following steps:

receiving a service invocation information related to the ongoing call from the circuit switched controlled domain and receiving a packet-based service invocation information from the packet-based multimedia system, identifying a packet-based multimedia service according to the received service invocation information or according to the received packet based service invocation information handling a service execution in respect to the identified packet-based multimedia service on behalf of the user by using one or more parameters, including status of the ongoing call, the one or more parameters being stored and administered by an Access Gateway Node (MAGCF), and sending a service invocation information related to the identified packet based multimedia service to the circuit-switched controlled domain and sending a packet-based service invocation information related to the identified packet based multimedia service to the packet-based multimedia system.

12. The method according to claim 11 wherein handling of the service execution comprises converting the service invocation information into the corresponding packet-based service invocation information or converting the packet-based service invocation information into the corresponding service invocation information.

13. The method according to claim 11 wherein handling of the service execution comprises maintaining of a status of the service execution.

14. The method according to claim 11 wherein feedback information is generated in order to inform communicating nodes about the status of the service execution.

15. The method according to claim 13, wherein the maintaining of the status of the service execution comprises a maintaining of a timer for tracking a receiving of an answer for the sent service invocation information and for the sent packet-based service invocation information.

* * * * *

UNITED STATES PATENT AND TRADEMARK OFFICE
CERTIFICATE OF CORRECTION

PATENT NO. : 8,249,054 B2
APPLICATION NO. : 12/279904
DATED : August 21, 2012
INVENTOR(S) : Witzel et al.

Page 1 of 1

It is certified that error appears in the above-identified patent and that said Letters Patent is hereby corrected as shown below:

Title Page, Item (56), under "OTHER PUBLICATIONS", in Column 2, Line 4, delete "Circuite" and insert -- Circuit --, therefor.

In the Drawings

In Fig. 2, Sheet 2 of 6, for Tag "22", in Line 1, delete "Identyfying" and insert -- Identifying --, therefor.

In Fig. 2, Sheet 2 of 6, for Tag "24", in Line 1, delete "Maintaing" and insert -- Maintaining --, therefor.

In the Specification

In Column 6, Line 25, delete "occur-in" and insert -- occur in --, therefor.

In Column 7, Line 44, delete "depicted" and insert -- depicted. --, therefor.

In the Claims

In Column 11, Lines 12-13, in Claim 11, delete "information" and insert -- information, --, therefor.

Signed and Sealed this
Eleventh Day of June, 2013

Teresa Stanek Rea
*Acting Director of the United States Patent and Trademark Office*